United States Patent [19]
Fukumoto et al.

[11] Patent Number: 5,191,571
[45] Date of Patent: Mar. 2, 1993

[54] TRACKING CONTROL METHOD AND APPARATUS FOR AN OPTICAL DISC SYSTEM

[75] Inventors: Atsushi Fukumoto, Kanagawa; Kiyoshi Ohsato, Chiba, both of Japan

[73] Assignee: Sony Corporation, Tokyo, Japan

[21] Appl. No.: 705,492

[22] Filed: May 24, 1991

[30] Foreign Application Priority Data

May 31, 1990 [JP] Japan .................................. 2-142521

[51] Int. Cl.$^5$ .............................................. G11B 7/13
[52] U.S. Cl. .............................. 369/44.37; 369/44.41; 369/44.34
[58] Field of Search ............... 369/44.37, 44.41, 44.42, 369/44.13, 44.28, 44.34, 44.27, 44.25, 44.32, 44.11, 44.12, 105, 107, 109

[56] References Cited

U.S. PATENT DOCUMENTS

| | | | |
|---|---|---|---|
| 4,660,191 | 4/1987 | Maeda et al. | 369/44.37 |
| 4,787,076 | 11/1988 | Deguchi et al. | 369/44.37 |
| 4,914,645 | 4/1990 | Getreuer et al. | 369/44.13 |
| 4,993,011 | 2/1991 | Torazawa et al. | 369/44.37 |
| 5,062,094 | 10/1991 | Hamada et al. | 369/44.37 |

FOREIGN PATENT DOCUMENTS 60-143441  7/1985  Japan .................................. 369/44.41

Primary Examiner—Aristotelis Psitos
Assistant Examiner—Muhammad Edun
Attorney, Agent, or Firm—Philip M. Shaw, Jr.

[57] ABSTRACT n pairs of light beams are applied to an optical disc to form a plurality of beam spots thereon which are offset by ½n of a track pitch p, and n signals which are shifted p/2n in spatial phase are generated from detected output signals indicative of light beams reflected from the beam spots. These n signals are multiplied to produce a tracking control signal whose spatial period is 1/n of the track pitch p. Alternatively, the optical disc has n pairs of wobbling pits or servo pits which are offset by ½n of a tracking pitch p are disposed on an optical disc, and the n pairs of servo pits are scanned by a light beam to produce n signals that are shifted p/2n in spatial phase. The tracking control method is effective to effect tracking control on an optical disc whose recording tracks are arranged at a high density that exceeds the spatial cutoff frequency of an optical system of conventional nature used with the tracking control method.

10 Claims, 14 Drawing Sheets

FIG. 2 (PRIOR ART)
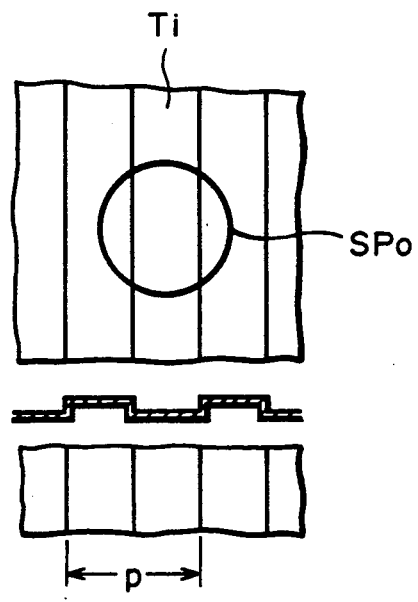
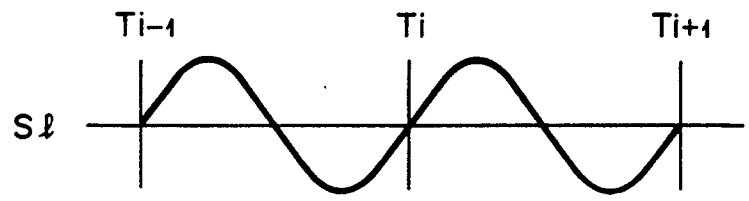
FIG. 3A (PRIOR ART)   S$\ell$
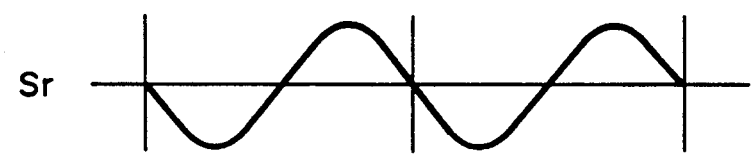
FIG. 3B (PRIOR ART)   Sr
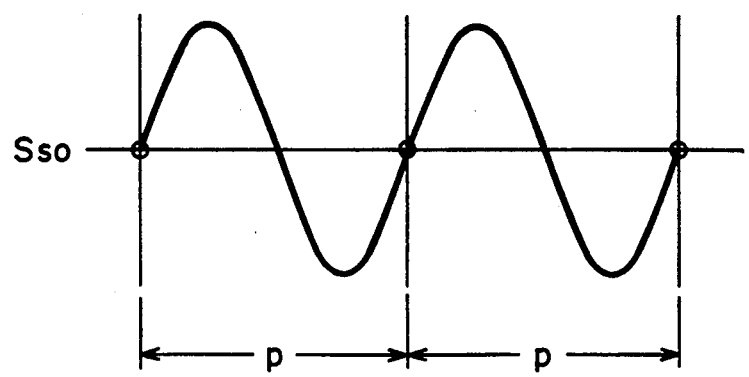
FIG. 3C (PRIOR ART)   Sso

TRACKING CONTROL METHOD AND APPARATUS FOR AN OPTICAL DISC SYSTEM

BACKGROUND OF THE INVENTION

1. Field of the Invention

The present invention relates to a tracking control method and apparatus for use with an optical disc system which is suitable for high-density recording of information.

2. Description of the Prior Art

Some conventional optical discs have recording tracks along a predetermined spirally continuous guide groove. Usually, information is written in the recording tracks in the form of grooves, and lands between the track grooves are left blank and used to read the written information without error. On certain optical discs, there is employed sampled format for each track in order to determine positions where the recording tracks are to be formed.

When information is recorded on or reproduced from an optical disc through an optical pickup, the optical pickup is subject to a tracking control process in order to enable a light beam to follow the recording tracks on the optical disc automatically.

For recording or reproducing information on or from an optical disc of the continuous groove type, for example, as shown in FIG. 1 of the accompanying drawings, a light beam reflected from an optical disc D passes through an objective lens 2 and a beam splitter 3 of an optical pickup 1 and reaches a photodetector 4, which produces a tracking control signal. The tracking control signal is then supplied to a two-axis actuator 5 to actuate the optical pickup 1 radially with respect to the optical disc D.

In FIG. 1, the photodetector 4 comprises a two-segment photodetector which is composed of two light-detecting elements 4l, 4r that are symmetric with respect to the center of a track. A tracking error is detected as the difference between the detected output signals from the respective light-detecting elements 4l, 4r. This tracking control method is known as a push-pull method.

According to the push-pull method, as shown in FIG. 2, the diameter of a beam spot SPo on the optical disc D is substantially the same as a track pitch p of 1.6 μm, for example.

If it is assumed that the beam spot is spaced a distance x from the center of any track Ti in the radiation direction of the optical disc D, then detected output signals Sl, Sr produced by the light-detecting elements 4l, 4r, respectively, from the reflection of the beam spot SPo have spatial periods equal to the track pitch p, are spatial phase shifted ¼ from the phase of the track pitch p, and are represented by sine waves that are opposite in phase, as shown in FIGS. 3A and 3B. The detected output signals Sl, Sr are indicated by the following equations (1a), 1(b):

$$Sl = \sin(2\pi x/p) \tag{1a}$$

$$Sr = -\sin(2\pi x/p) \tag{1b}$$

As shown in FIG. 3C, the difference Sso between the detected output signals Sl, Sr is represented by a sine wave which crosses the zero value in the positive direction at the center of the track Ti. The difference Sso is given by the following equation (2):

$$SSo = 2\sin(2\pi x/p) \tag{2}$$

A three-spot method as shown in FIG. 4 may be used to detect a tracking error on an optical disc (see, for example, U.S. Pat. No. 3,876,842).

According to the three-spot method, two auxiliary beams of diffracted light of the first order are applied to an optical disc in addition to a recording or reproducing light beam (main beam), such that two auxiliary beam spots SPa, SPb are formed on the optical disc by the applied auxiliary beams in point symmetry with respect to a main beam spot SPo formed by the main beam.

The diameter of each of the beam spots is substantially the same as a track pitch p of 1.6 μm, for example. The auxiliary beam spots SPa, SPb and the main beam spot SPo are spaced apart radially of the optical disc by ¼ of the track pitch p.

Two auxiliary beams reflected by the optical disc from the auxiliary beam spots are detected by respective light-detecting elements of an optical pickup.

If it is assumed that each beam spot is spaced a distance x from the center of any track Ti in the radiation direction of the optical disc, then detected output signals Sa, Sb produced by the light-detecting elements, respectively, from the reflection of the auxiliary beam spots SPa, SPb are represented by sine waves that are opposite in phase, also as shown in FIGS. 3A and 3B. The detected output signals Sa, Sb are indicated by the following equations (3a), 3(b):

$$Sa = \sin(2\pi x/p) \tag{3a}$$

$$Sb = -\sin(2\pi x/p) \tag{3b}$$

Also as shown in FIG. 3C, the difference Sab between the detected output signals Sa, Sb is represented by a sine wave which crosses the zero value in the positive direction at the center of the track Ti. The difference Sab is given by the following equation (4):

$$Sab = 2\sin(2\pi x/p) \tag{4}$$

The differential signal, i.e., the signal indicative of the difference Sab, is used as a tracking control signal in the three-spot method.

One type of optical disc employs a sampled format in which wobbling pits are provided for the detection of a tracking error, for example. On such an optical disc, as shown in FIG. 5, a pair of wobbling pits (servo pits) PTa, PTb is formed in a particular region (servo region), the wobbling pits PTa, PTb being spaced apart from each other along a track and spaced from the center of the track by a distance which is ¼ of the track pitch p. A reference control pit PTo is also provided on the center of the track in a position spaced certain distances from the servo pits PTa, PTb along the track.

When information is recorded on or reproduced from the optical disc, the servo pits PTa, PTb are scanned by a light beam having a diameter which is approximately the same as the track pitch p. Detected output signals Sa, Sb which are produced in timed relation to the respective servo pits PTa, PTb are represented by sine waves that are opposite in phase, and expressed by the following equations (5a), (5b):

$$Sa = -\sin(2\pi x/p) \tag{5a}$$

$$Sb = \sin(2\pi x/p) \tag{5b}$$

Also as shown in FIG. 3C, the difference Sba between the detected output signals Sa, Sb is represented by a sine wave which crosses the zero value in the positive direction at the center of the track Ti. The difference Sba is given by the following equation (6):

$$Sba = 2 \sin(2\pi x/p) \qquad (6).$$

The differential signal, i.e., the signal indicative of the difference Sba, is used as a tracking control signal on the sampled-format optical disc.

In the case where the track pitch p is reduced to the extent that the reciprocal of the track pitch p exceeds the spatial cutoff frequency of the optical pickup, the optical pickup cannot read the recorded information and produce an optical image, thus failing to generate a tracking signal.

For example, if the wavelength λ of light and the numerical aperture NA of the objective lens are $$\lambda = 0.7 \ \mu m, \ NA = 0.5,$$

then the spatial cutoff frequency fc is given as follows:

$$fc = 2NA/\lambda = 1/\lambda \approx 1280/mm.$$

In the range of p≤λ=0.78 μm, i.e., when the tracking pitch p is smaller than the wavelength λ of light, it is unable to effect any tracking servo process.

OBJECTS AND SUMMARY OF THE INVENTION

In view of the aforesaid problems of the conventional tracking control methods, it is an object of the present invention to provide a tracking control method for an optical disc system which has recording tracks at a high density that exceeds the spatial cutoff frequency of an optical system employed by the tracking control method.

Another object of the present invention is to provide an apparatus for carrying out the above method.

According to the present invention, there is provided a tracking control apparatus for controlling a light beam to follow a track on an optical disc, comprising a laser source for generating a plurality of light beams, means for applying the light beams from the laser source to the optical disc as beam spots which are offset on the optical disc by 1/2n n (n is a positive integer of 2 or more) of a track pitch on the optical disc, photodetector means for detecting light beams reflected by the optical disc from the beam spots, tracking control signal generating means for generating n signals which are shifted 1/2n of the track pitch in spatial phase, based on a detected output signal from the photodetector means, and for multiplying the n signals to produce a tracking control signal whose spatial period is 1/n of the track pitch, and means for controlling the light beam applied from the laser source to the optical disc based on the tracking control signal.

According to the present invention, there is also provided a tracking control apparatus for controlling a light beam to follow a track on an optical disc having n pairs of wobbling pits which are offset by 1/2n (n is a positive integer of 2 or more) of a track pitch on the optical disc, the tracking control apparatus comprising a laser source for generating a light beam, photodetector means for detecting a light beam reflected by the optical disc from the wobbling pits, tracking control signal generating means for generating n signals which are shifted ½n of the track pitch in spatial phase, based on a detected output signal from the photodetector means, and for multiplying the n signals to produce a tracking control signal whose spatial period is 1/n of the track pitch, and means for controlling the light beam applied from the laser source to the optical disc based on the tracking control signal.

According to the present invention, there is further provided a method of controlling a light beam to follow a track on an optical disc, comprising the steps of applying a plurality of light beams from a laser source to the optical disc as beam spots which are offset on the optical disc by 1/2n (n is a positive integer of 2 or more) of a track pitch on the optical disc, detecting light beams reflected by the optical disc from the beam spots, with photodetector means, generating n signals which are shifted 1/2n of the track pitch in spatial phase, based on a detected output signal from the photodetector means, multiplying the n signals to produce a tracking control signal whose spatial period is 1/n of the track pitch, and controlling the light beam from the laser source based on the tracking control signal.

According to the present invention, there is also provided a method of controlling a light beam to follow a track on an optical disc having n pairs of wobbling pits which are offset by 1/2n (n is a positive integer of 2 or more of a track pitch on the optical disc, the method comprising the steps of applying a light beam from a laser source to the optical disc, detecting a light beam reflected by the optical disc from the wobbling pits, with photodetector means, generating n signals which are shifted 1/2n of the track pitch in spatial phase, based on a detected output signal from the photodetector means, multiplying the n signals to produce a tracking control signal whose spatial period is 1/n of the track pitch, and controlling the light beam from the laser source based on the tracking control signal.

With the arrangement of the present invention, it is possible to effect tracking control on an optical disc having recording tracks arranged at a high density that exceeds the spatial cutoff frequency of an optical system of conventional nature.

The above and other objects, features, and advantages of the present invention will become apparent from the following detailed description of illustrative embodiments thereof to be read in conjunction with the accompanying drawings, in which like reference numerals represent the same or similar objects.

BRIEF DESCRIPTION OF THE DRAWINGS

FIG. 2 is a schematic view illustrating a conventional tracking control method for an optical disc system;

FIGS. 3A, 3B, and 3C are diagrams illustrating operation of the conventional tracking control method;

DETAILED DESCRIPTION OF THE PREFERRED EMBODIMENTS

Figure 1:
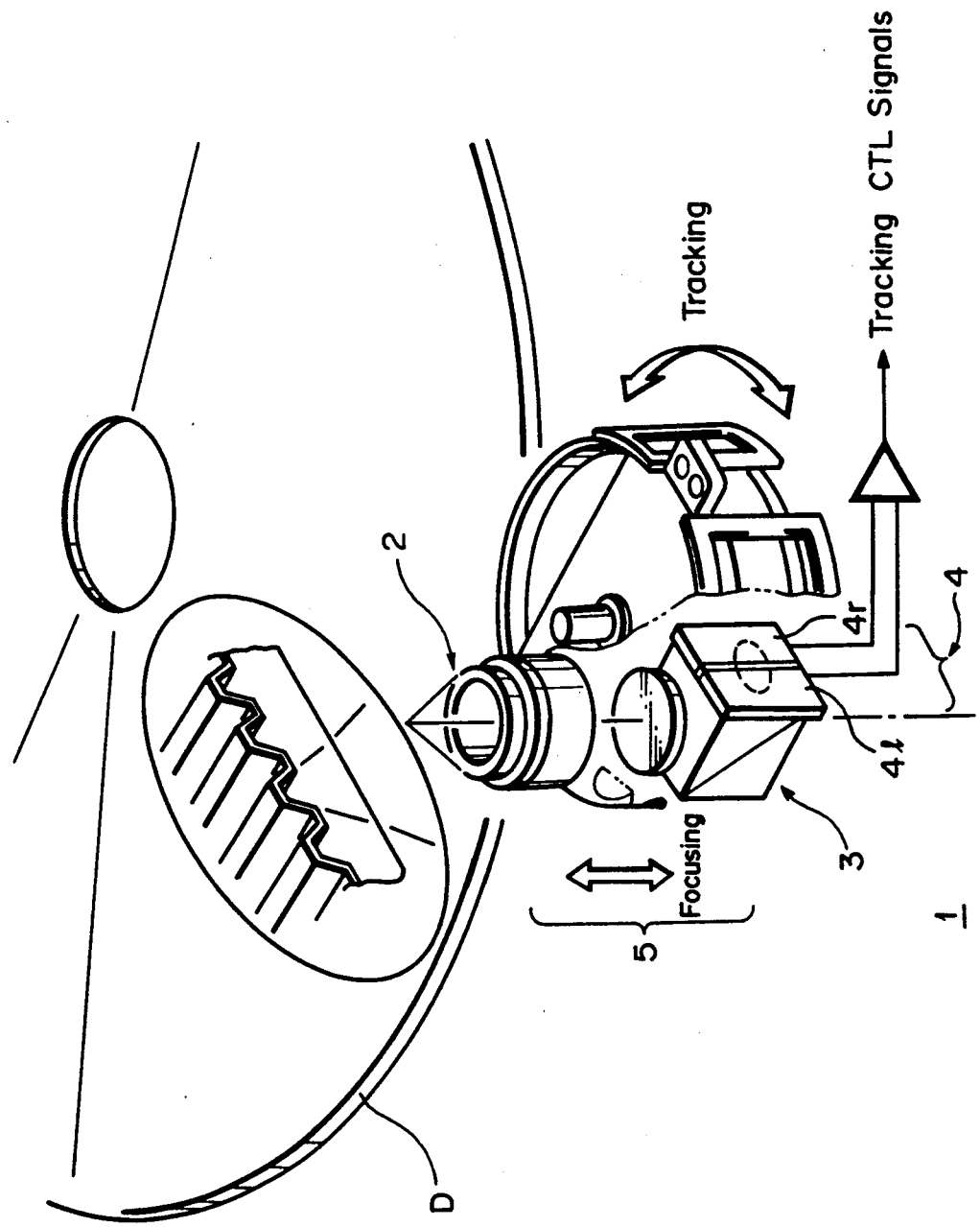
FIG. 1 is a perspective view of a tracking control mechanism, explanatory of the present invention.

Like or corresponding parts are denoted by like or corresponding reference characters throughout views.

A tracking control method for an optical disc system according to a first embodiment of the present invention will be described below with reference to FIGS. 6, 7, 8A, 8B, and 8C.

Figure 6:
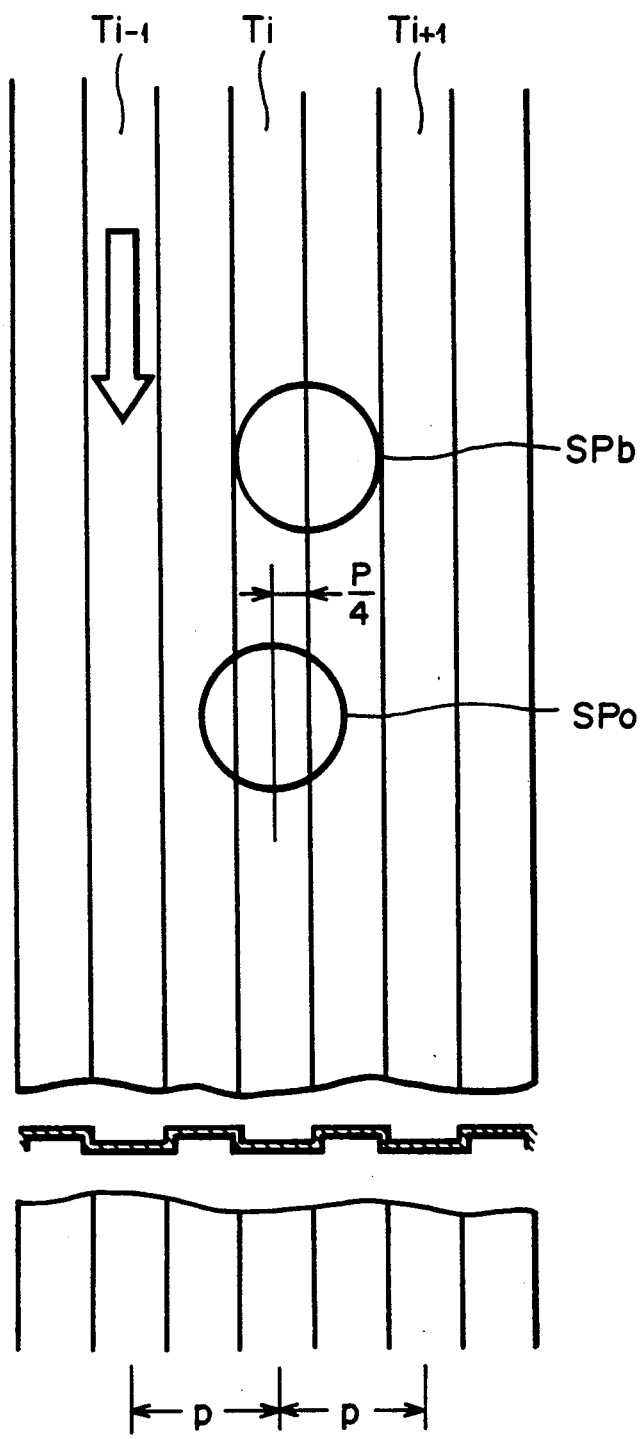
FIG. 6 is a schematic view illustrating a tracking control method for an optical disc system according to a first embodiment of the present invention.
Figure 7:
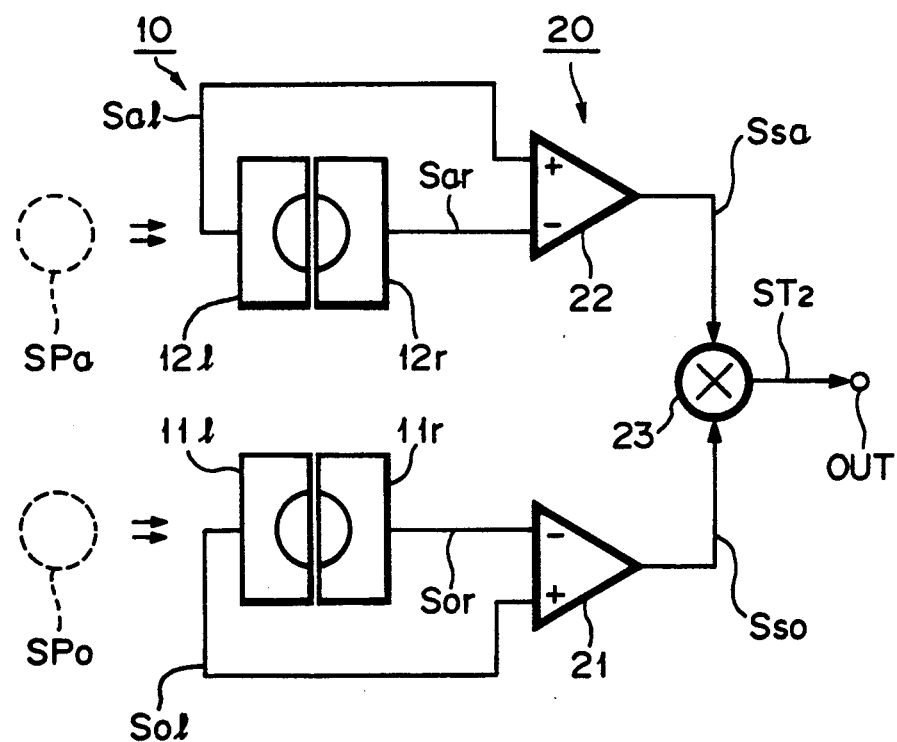
FIG. 7 is a block diagram of a control circuit for carrying out the tracking control method according to the first embodiment.

FIG. 6 schematically shows the manner in which the tracking control method according to the first embodiment operates, and FIG. 7 shows a control circuit for effecting the tracking control method according to the first embodiment. Those parts shown in FIG. 6 which are identical to those shown in FIG. 2 are denoted by identical reference characters.

In FIG. 6, an auxiliary beam spot SPa of diffracted light of first order, for example, which may be produced by passing a laser beam from a laser beam source through a diffraction grating, is applied to an optical disc in addition to a main beam spot SPo. The auxiliary beam spot SPa is spaced or offset radially outwardly from the main beam spot SPo by ¼ of the track pitch p in the radial direction of the optical disc. The other structural details are the same as those shown in FIG. 2.

As shown in FIG. 7, the control circuit includes a photodetector 10 comprising two pairs of light-detecting elements 11$l$, 11$r$, 12$l$, 12$r$ for detecting light beams reflected by the optical disc from the beam spots SPa, SPo. The control circuit also includes a control signal generator 20 comprising two differential amplifiers 21, 22 and a multiplier 23. The differential amplifier 21 determines the difference between output signals from the light-detecting elements 11$l$, 11$r$, whereas the differential amplifier 22 determines the difference between output signals from the light-detecting elements 12$l$, 12$r$. The multiplier 23 multiplies output signals from the differential amplifiers 21, 22. An output signal from the multiplier 23 is supplied as tracking control signal through an output terminal OUT to a two-axis actuator (see FIG. 1) of an optical pickup.

Operation of the tracking control method according to the first embodiment will be described below also with reference to FIGS. 8A, 8B, and 8C.

The detected output signals Sol, Sor produced from the light-detecting elements 11$l$, 11$r$ in response to the light beam reflected from the main beam spot SPo are represented by sine waves which are opposite in phase, and are expressed by the equations (1a), (1b), respectively. The differential signal Sso produced by the differential amplifier 21 from the detected output signals Sol, Sor is expressed according to the equation (2), and is also represented by a sine wave whose spatial period is equal to the track pitch p and which crosses the zero value in a positive direction at the center of any track Ti, as shown in FIG. 8A.

The detected output signals Sal, Sar produced from the light-detecting elements 12$l$, 12$r$ in response to the light beam reflected from the auxiliary beam spot SPa are represented by sine waves which are opposite in phase and lead the detected output signals Sol, Sor by $\pi/2$ (¼ of the track pitch p), and are expressed by the following equations (7a), (7b):

$$Sal = -\cos(2\pi x/p) \quad (7a)$$

$$Sar = \cos(2\pi x/p) \quad (7b).$$

Figures 8A, 8B, 8C:
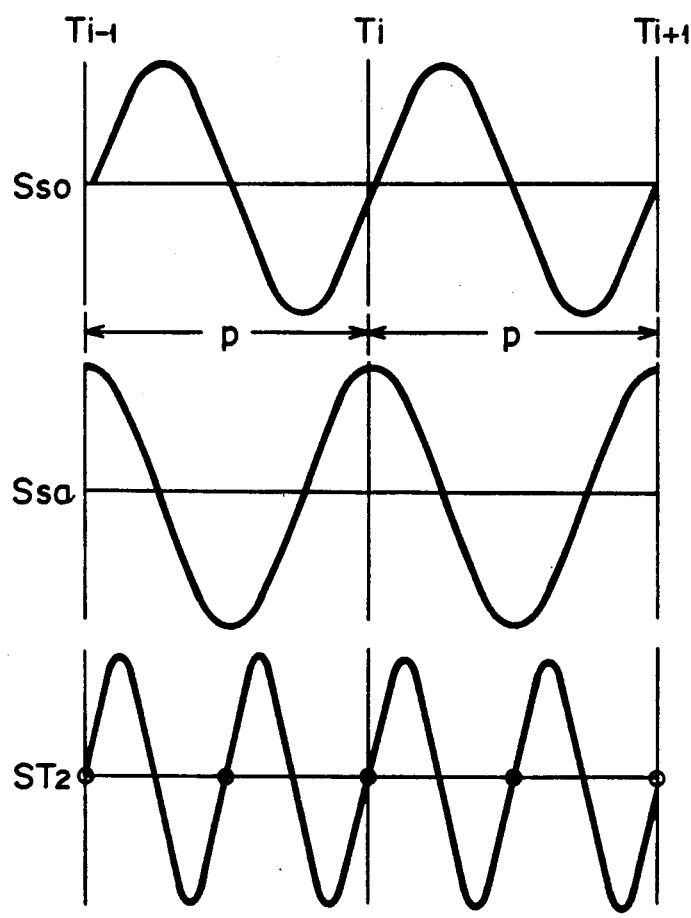
FIGS. 8A, 8B, and 8C are diagrams illustrative of operation of the tracking control method according to the first embodiment.

The differential signal Ssa produced by the differential amplifier 22 from the detected output signals Sal, Sar is represented by a cosine wave whose spatial period is the same as the track pitch p and has a maximum value at the center of any track Ti, as shown in FIG. 8B, and is expressed according to the following equation (8):

$$Ssa = 2\cos(2\pi x/p) \quad 8).$$

The multiplier 23 multiplies the differential signals Sso, Ssa, and, as a result, produces a tracking control signal ST2 representing the product, as expressed according to the following equation (9):

$$ST2 = Sso \cdot Ssa \quad (9)$$
$$= 2\sin(2 \cdot 2\pi x/p).$$

As shown in FIG. 8C, the tracking control signal ST2 is represented by a sine wave whose spatial period is ½ of the track pitch p and which crosses the zero value in a positive direction at each of the center of any track Ti and an intermediate point between two adjacent tracks, e.g., tracks Ti, Ti+1.

According to this embodiment, therefore, tracks spaced at ½ of the conventional track pitch p, i.e., at a density which is twice the density of the conventional tracks, can well be followed while the same light source and lens system as those of the conventional arrangement are employed.

Consequently, information can be written on and read from lands between grooves, which lands would usually be left blank, on an optical disc of the continuous groove configuration. As a result, information can be recorded on and reproduced from the optical disc at a density that is twice the conventional recording density.

A tracking control method for an optical disc system according to a second embodiment of the present invention will be described below with reference to FIGS. 9 and 10.

Figure 4:
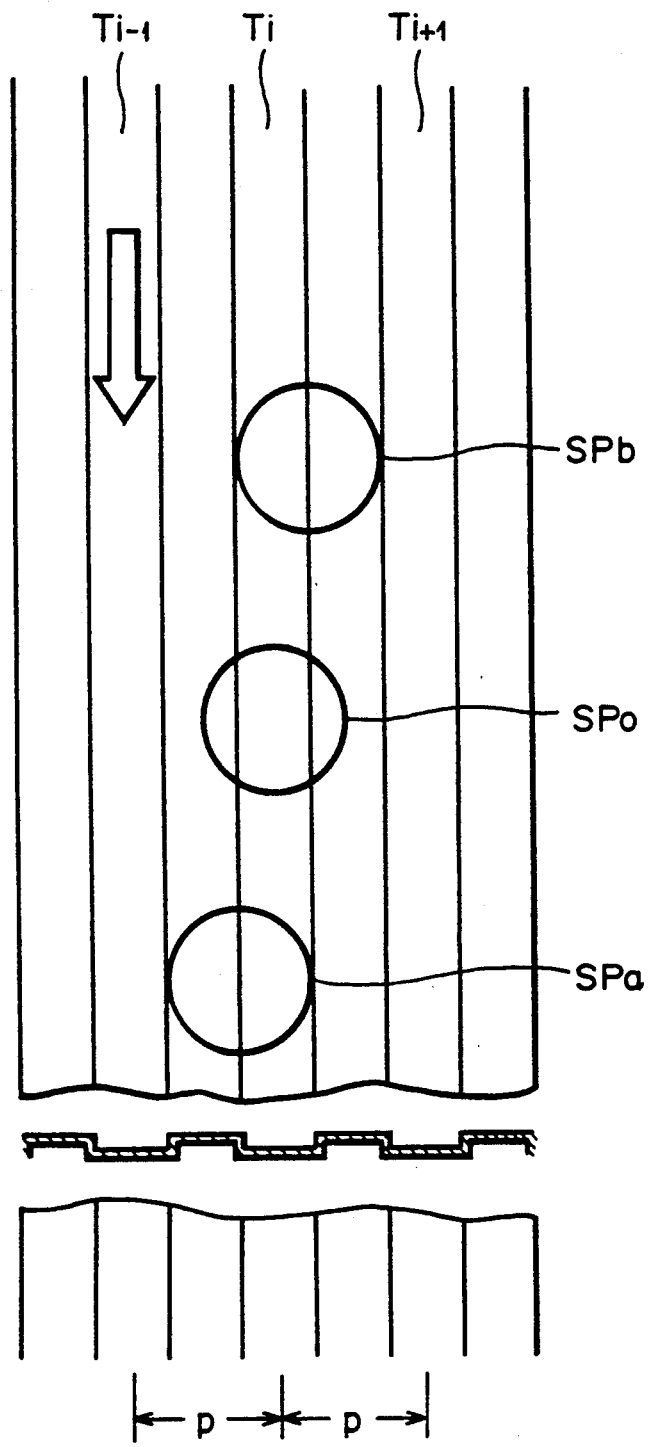
FIG. 4 is a schematic view illustrating another conventional tracking control method for an optical disc system.
Figure 9:
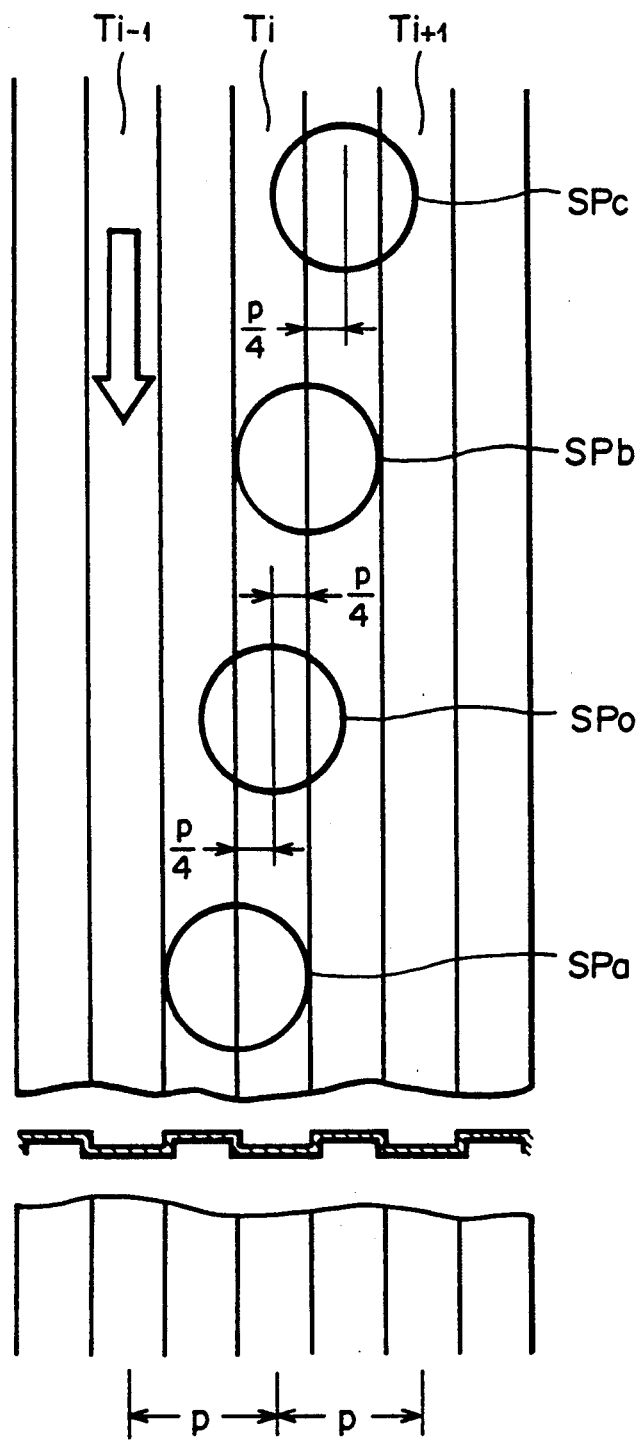
FIG. 9 is a schematic view illustrating a tracking control method for an optical disc system according to a second embodiment of the present invention.
Figure 10:
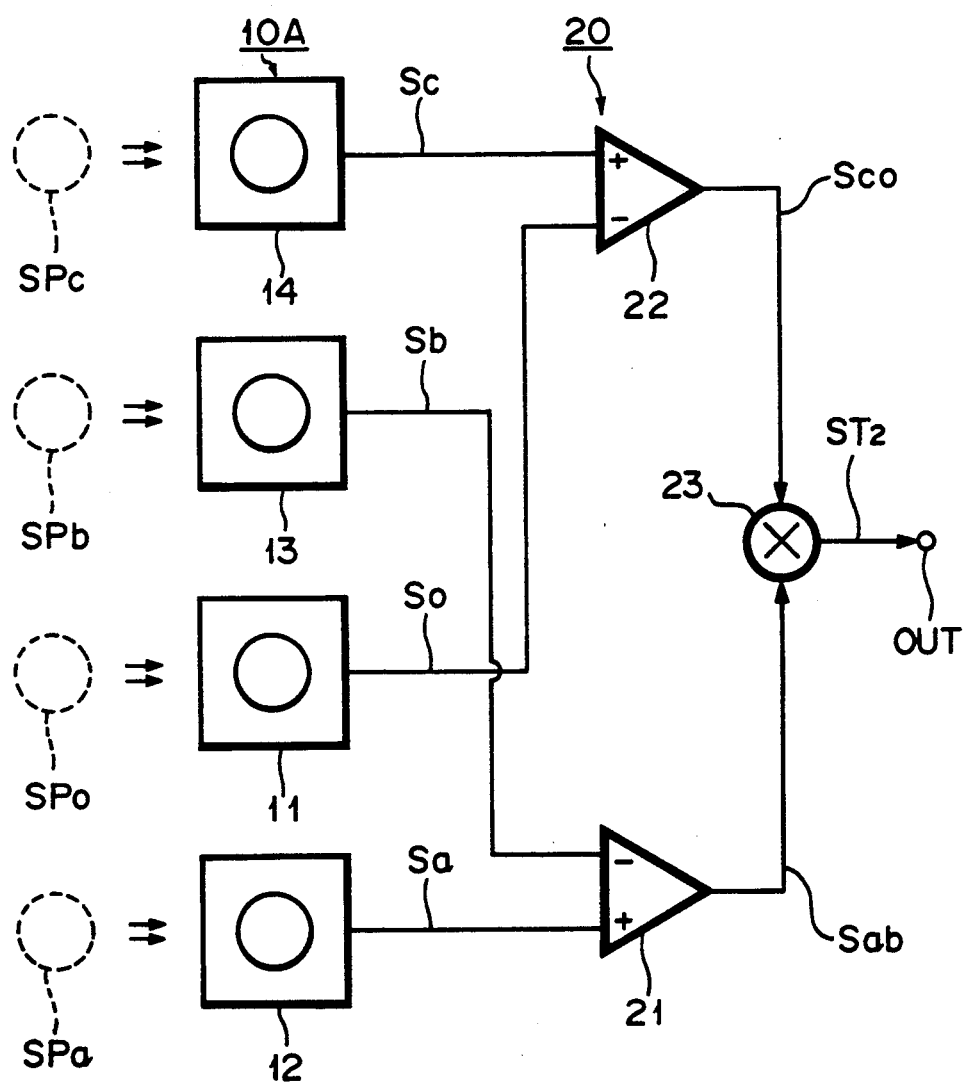
FIG. 10 is a block diagram of a control circuit for carrying out the tracking control method according to the second embodiment.

FIG. 9 schematically shows the manner in which the tracking control method according to the second embodiment operates, and FIG. 10 shows a control circuit for effecting the tracking control method according to the second embodiment. Those parts shown in FIG. 9 which are identical to those shown in FIG. 4 are denoted by identical reference characters.

In FIG. 9, a third auxiliary beam spot SPc of diffracted light of second order, for example, which may be produced by passing a laser beam from a laser beam source through a diffraction grating, is applied to an optical disc in addition to a main beam spot SPo and first and second auxiliary beam spots SPa, SPb. The auxiliary beam spot SPc is spaced or offset radially outwardly from the main beam spot SPo by ¼ of the track pitch p in the radial direction of the optical disc. The auxiliary beam spot SPc and the main beam spot SPo are in point symmetry with respect to the second auxiliary beam spot SPb The other structural details are the same as those shown in FIG. 4.

As shown in FIG. 10, the control circuit includes a photodetector 10A comprising four light-detecting elements 11, 12, 13, 14 for detecting light beams reflected by the optical disc from the four beam spots SPo, SPa, SPb, SPc, respectively. The control circuit also includes a control signal generator 20 comprising two differential amplifiers 21, 22 and a multiplier 23. The differential amplifier 21 determines the difference between output signals from the light-detecting elements 12, 13, whereas the differential amplifier 22 determines the difference between output signals from the light-detecting elements 14, 11. The multiplier 23 multiplies output signals from the differential amplifiers 21, 22. An output signal from the multiplier 23 is supplied as a tracking control signal through an output terminal OUT to a two-axis actuator (see FIG. 1) of an optical pickup.

Operation of the tracking control method according to the first embodiment will be described below also with reference to FIGS. 8A, 8B, and 8C.

The detected output signals Sa, Sb produced from the light-detecting elements 12, 13 in response to the light beam reflected from the first and second auxiliary beam spots SPa, SPb are represented by sine waves which are opposite in phase, and are expressed by the equations (3a), (3b), respectively. The differential signal Sab produced by the differential amplifier 21 from the detected output signals Sa, Sb is expressed according to the equation (4), and is also represented by a sine wave whose spatial period is equal to the track pitch p and which crosses the zero value in a positive direction at the center of any track Ti, as shown in FIG. 8A.

The detected output signals So, Sc produced from the light-detecting elements 11, 14 in response to the light beam reflected from the main beam spot SPo and the third auxiliary beam spot SPc are represented by sine waves which are opposite in phase and lead the detected output signals Sa, Sb by $\pi/2$ (¼ of the track pitch p), and are expressed by the following equations (10a), (10b):

$$So = -\cos(2\pi x/p) \tag{10a}$$

$$Sc = \cos(2\pi x/p) \tag{b 10b}$$

The differential signal Sco produced by the differential amplifier 22 from the detected output signals So, Sc is represented by a cosine wave whose spatial period is the same as the track pitch p and has a maximum value at the center of any track Ti, as shown in FIG. 8B, and is expressed according to the following equation (11):

$$Sco = 2\cos(2\pi x/p) \tag{11}$$

The multiplier 23 multiplies the differential signals Sab, Sco, and, as a result, produces a tracking control signal ST2 representing the product, as expressed according to the following equation (12):

$$\begin{aligned} ST2 &= Sab \cdot Sco \\ &= 2\sin(2 \cdot 2\pi x/p). \end{aligned} \tag{12}$$

As shown in FIG. 8C, the tracking control signal ST2 is represented by a sine wave whose spatial period is ½ of the track pitch p and which crosses the zero value in a positive direction at each of the center of any track Ti and an intermediate point between two adjacent tracks, e.g., tracks Ti, Ti+1.

According to the embodiment shown in FIG. 9, therefore, tracks spaced at ½ of the conventional track pitch p, i.e., at a density which is twice the density of the conventional tracks, can well be followed while the same light source and lens system as those of the conventional arrangement are employed.

Consequently, information can be written on and read from lands between grooves, which lands would usually be left blank, on an optical disc of the continuous groove configuration. As a result, information can be recorded on and reproduced from the optical disc at a density that is twice the conventional recording density.

A tracking control method for an optical disc system according to a third embodiment of the present invention will be described below with reference to FIGS. 11 and 12.

Figure 5:
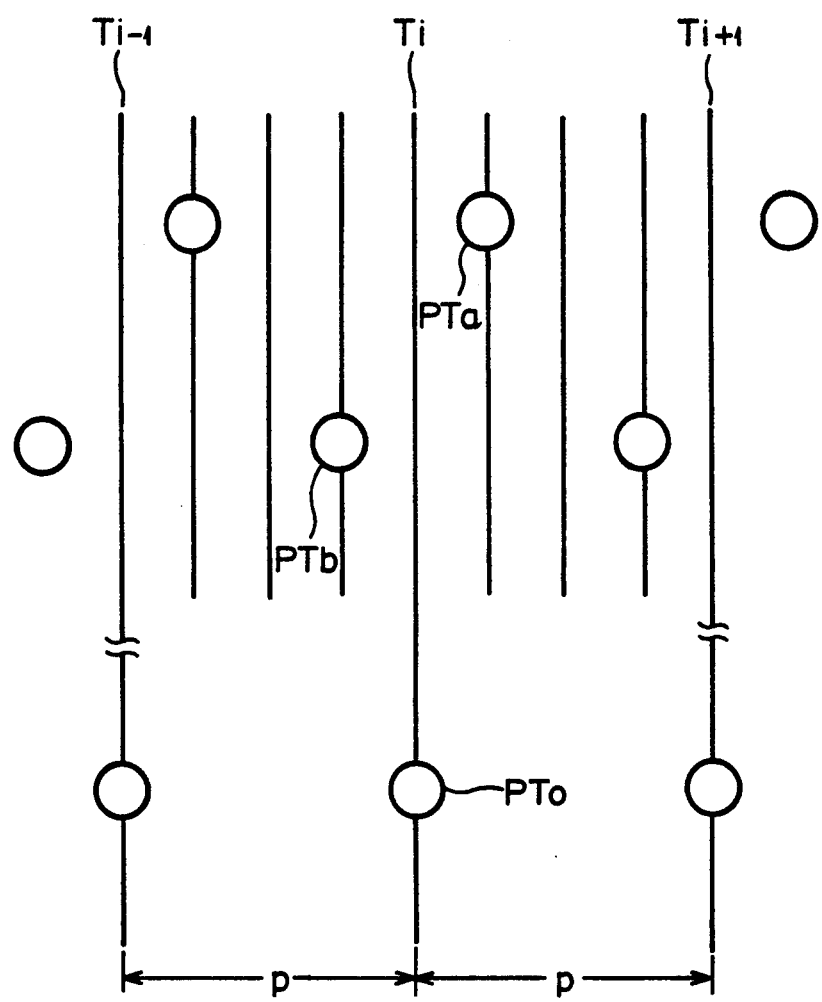
FIG. 5 is a schematic view illustrating still another conventional tracking control method for an optical disc system.
Figure 11:
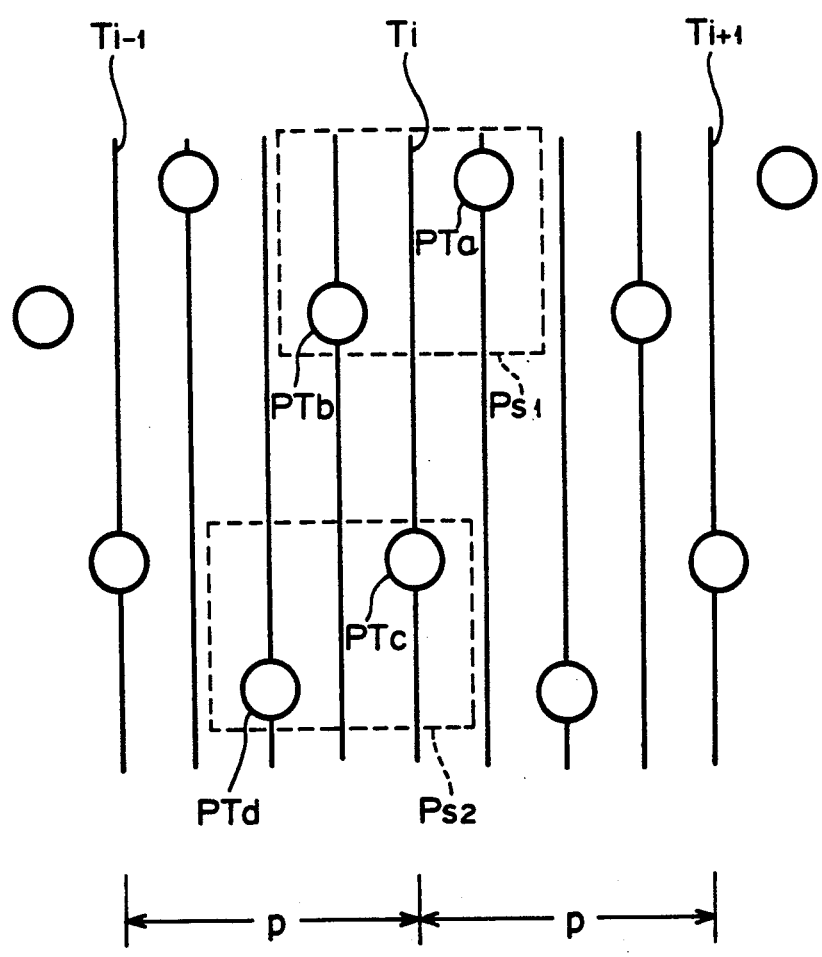
FIG. 11 is a schematic view illustrating a tracking control method for an optical disc system according to a third embodiment of the present invention.
Figure 12:
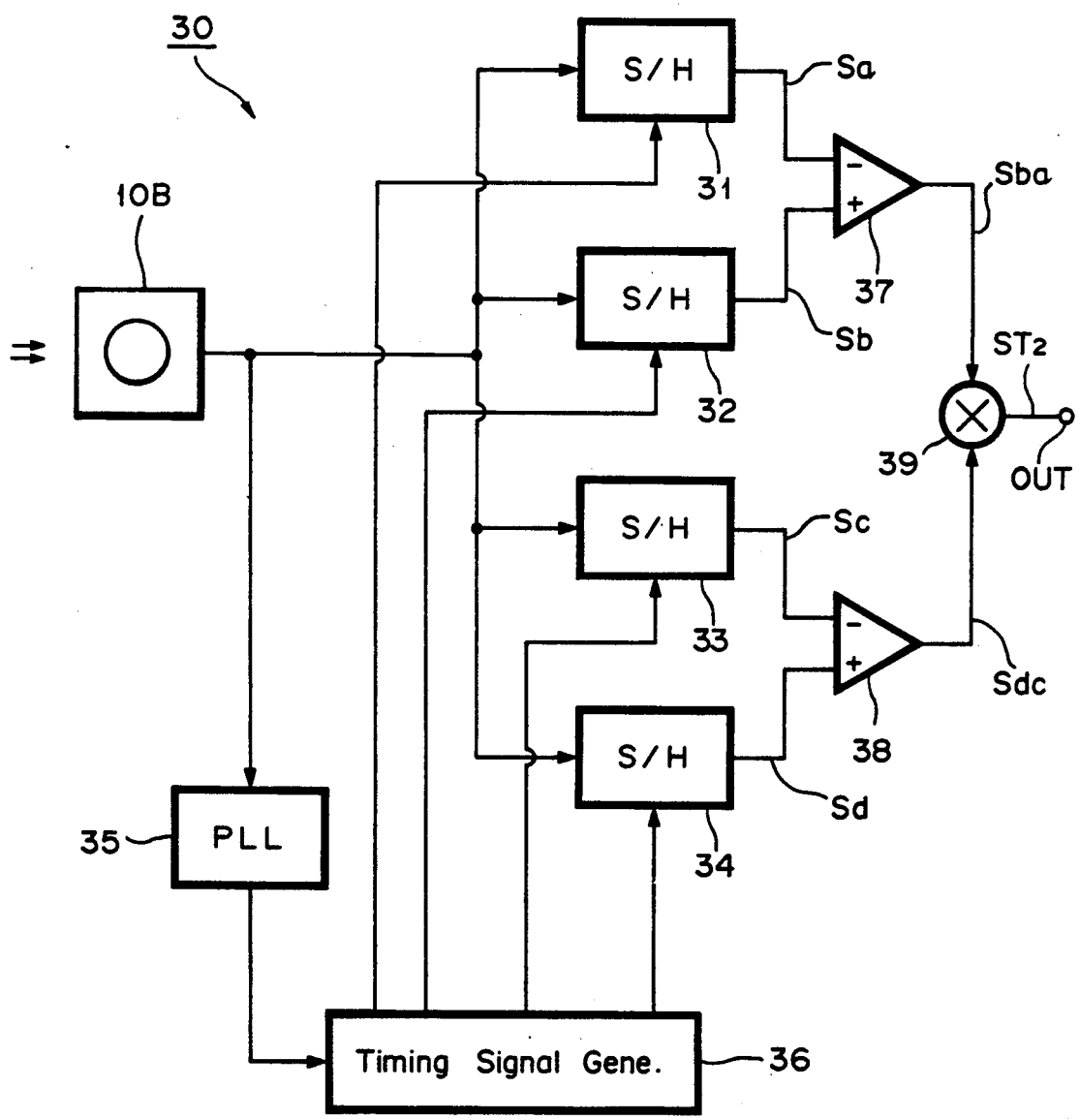
FIG. 12 is a block diagram of a control circuit for carrying out the tracking control method according to the third embodiment.

FIG. 11 schematically shows the manner in which the tracking control method according to the third embodiment operates, and FIG. 12 shows a control circuit for effecting the tracking control method according to the third embodiment. Those parts shown in FIG. 11 which are identical to those shown in FIG. 5 are denoted by identical reference characters.

In FIG. 11, a new pair Ps2 of wobbling pits or servo pits PTc, PTd is provided on an optical disc in addition to the conventional pair Ps1 of servo pits PTa, PTb. The new servo pit pair Ps2 is spaced from the servo pit pair Ps1 along a track. The new servo pits PTc, PTd are disposed respectively on the central line of a track Ti and the intermediate line between the track Ti and a preceding track Ti−1. The new servo pits PTc, PTd are spaced from the servo pits PTa, PTb, respectively, by ¼ of the track pitch P in the radial direction of the optical disc.

A control pit PTo on the intermediate line is omitted from illustration. The other structural details are the same as those shown in FIG. 5.

As shown in FIG. 12, the control circuit includes a control signal generator 30 comprising four sample-and-hold circuits 31, 32, 33, 34 corresponding respectively to the servo pits PTa, PTb, PTc, PTd. In response to a light beam reflected from the optical disc, a photodetector 10B supplies a detected output signal to the sample-and-hold circuits 31, 32, 33, 34, and also through a PLL circuit 35 to a timing signal generator 36. The timing signal generator 36 applies timing signals to the sample-and-hold circuits 31, 32, 33, 34.

A differential amplifier 37 determines the difference between output signals from the sample-and-hold circuits 31, 32, whereas a differential amplifier 38 determines the difference between output signals from the sample-and-hold circuits 33, 34.

A multiplier 39 multiplies output signals from the differential amplifiers 37, 38. An output signal from the multiplier 39 is supplied as a tracking control signal through an output terminal OUT to a two-axis actuator (see FIG. 1) of an optical pickup.

Operation of the tracking control method according to the third embodiment will be described below also with reference to FIGS. 8A, 8B, and 8C.

The detected output signals Sa, Sb produced from the sample-and-hold circuits 31, 32 in response to the light beams reflected from the servo pits PTa, PTb are represented by sine waves which are opposite in phase, and are expressed by the equations (5a), (5b), respectively. The differential signal Sba produced by the differential amplifier 37 from the detected output signals Sa, Sb is expressed according to the equation (6), and is also represented by a sine wave whose spatial period is equal to the track pitch p and which crosses the zero value in a positive direction at the center of any track Ti, as shown in FIG. 8A.

The detected output signals Sc, Sd produced from the sample-and-hold circuits 33, 34 in response to the light beams reflected from the servo pits PTc, PTd are represented by cosine waves which are opposite in phase and lead the detected output signals Sa, Sb by $\pi/2$ ($\frac{1}{4}$ of the track pitch p), and are expressed by the above equations (10a), (10b).

The differential signal Sdc produced by the differential amplifier 38 from the detected output signals Sc, Sd is represented by a cosine wave whose spatial period is the same as the track pitch p and has a maximum value at the center of any track Ti, as shown in FIG. 8B, and is expressed according to the following equation (13):

$$Sdc = 2\cos(2\pi x/p) \tag{13}$$

The multiplier 39 multiplies the differential signals Sba, Sdc, and, as a result, produces a tracking control signal ST2 representing the product, as expressed according to the following equation (14):

$$\begin{aligned} ST2 &= Sba \cdot Sdc \\ &= 2\sin(2 \cdot 2\pi x/p). \end{aligned} \tag{14}$$

As shown in FIG. 8C, the tracking control signal ST2 is represented by a sine wave whose spatial period is $\frac{1}{2}$ of the track pitch p and which crosses the zero value in a positive direction at each of the center of any track Ti and an intermediate point between two adjacent tracks, e.g., tracks Ti−1, Ti.

According to the embodiment shown in FIG. 11, therefore, tracks spaced at $\frac{1}{2}$ of the conventional track pitch p, i.e., at a density which is twice the density of the conventional tracks, can well be followed while the same light source and lens system as those of the conventional arrangement are employed. Consequently, the tracking control method is effective for use with a sampled-format optical disc on which information is recorded at a density which is twice the conventional recording density.

Figure 13:
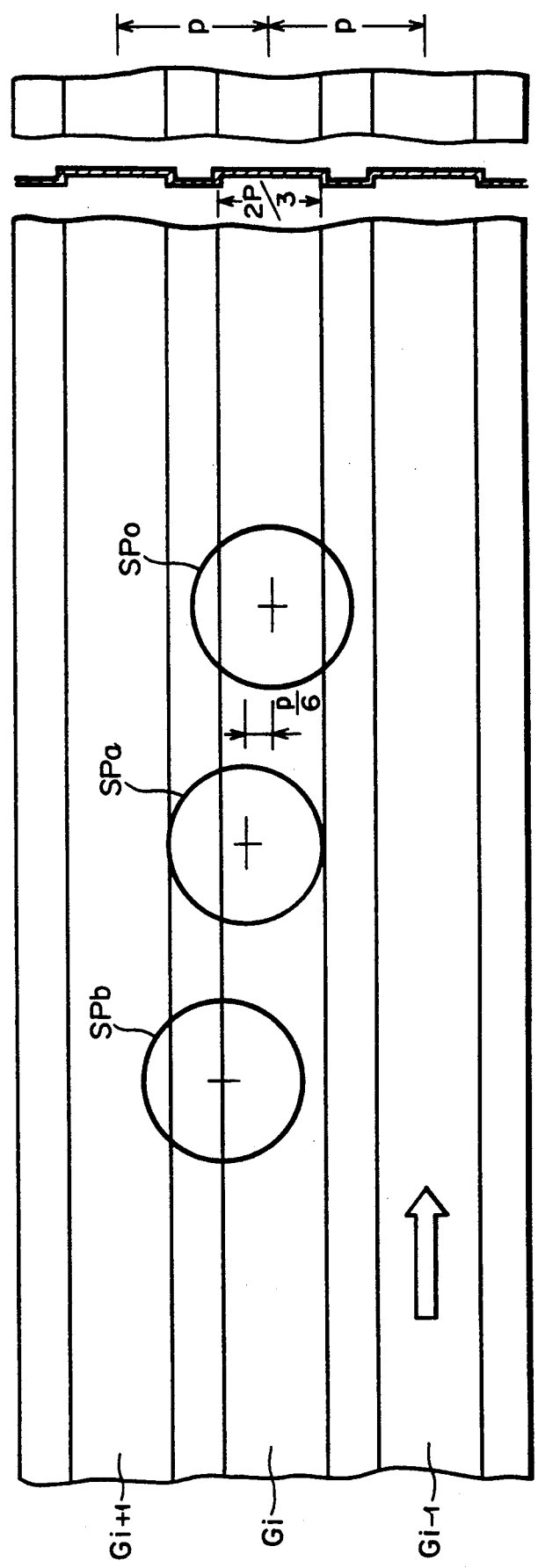
FIG. 13 is a schematic view illustrating a tracking control method for an optical disc system according to a fourth embodiment of the present invention.

The tracking control methods according to the previous embodiments are suitable for use with optical discs whose recording density is twice the conventional recording density. The present invention is also capable of dealing with optical discs of higher recording density as follows:

On an optical disc of the continuous groove type whose recording density is three times the conventional recording density, as shown in FIG. 13 which shows a fourth embodiment of the present invention, the width of each groove Gi is $\frac{2}{3}$ of the track pitch p, and the width of each land is $\frac{1}{3}$ of the track pitch p.

According to the push-pull method, a new auxiliary beam spot SPb of diffracted light of second order, for example, which may be produced by passing a laser beam from a laser beam source through a diffraction grating, is applied to an optical disc in addition to a main beam spot SPo and an auxiliary beam spot SPa as shown in FIG. 6. The auxiliary beam spot SPb and the main beam spot SPo are in point symmetry with respect to the auxiliary beam spot SPa.

The beam spots SPo, SPa, SPb are spaced or offset by 1/6 of the track pitch p in the radial direction of the optical disc. A control circuit includes a photodetector comprising three pairs of light-detecting elements (not shown) for detecting light beams reflected by the optical disc from the beam spots SPo, SPa, SPb. Differential signals Ss1, Ss2, Ss3 are generated from the detected output signals from the light-detecting elements. The differential signals Ss1, Ss2, Ss3 are shifted $\pi/3$ (1/6 of the track pitch p) in spatial phase as indicated by the following equations (15a), (15b), and (15c):

$$Ss1 = \sin\frac{2\pi x}{p} \tag{15a}$$

$$Ss2 = \sin\frac{2\pi}{p}\left(x - \frac{p}{6}\right) \tag{15b}$$

$$Ss3 = \sin\frac{2\pi}{p}\left(x - \frac{2p}{6}\right) \tag{15c}$$

As with the previous embodiments, the three differential signals Ss1, Ss2, Ss3 are multiplied, thereby producing a tracking control signal ST3 which is expressed according to the following equation (16):

$$\begin{aligned} ST3 &= Ss1 \cdot Ss2 \cdot Ss3 \\ &= (1/2)\sin(3 \cdot 2\pi x/p). \end{aligned} \tag{16}$$

As can be seen from the equation (16), the tracking control signal ST3 is represented by a sine wave whose spatial period is $\frac{1}{3}$ of the track pitch p and which crosses the zero value in a positive direction at each of the center of any track Ti and an intermediate point between two adjacent tracks, e.g., tracks Ti, Ti+1.

According to the embodiment shown in FIG. 13, therefore, tracks spaced at $\frac{1}{3}$ of the conventional track pitch p, i.e., at a density which is three times the density of the conventional tracks, can well be followed while the same light source and lens system as those of the conventional arrangement are employed. Therefore, the tracking control method according to the fourth embodiment is effective for us with optical discs of the continuous groove type whose recording density is three times the conventional recording density.

Generally, in order for a tracking control method to deal with optical discs of the continuous groove type whose recording density is n times the conventional recording density, the width of each groove Gi is selected to be $(n-1)/n$ of the track pitch p and the width of each land is selected to be $1/n$ of the track pitch p, and n differential signals Ss1, Ss2, Ss3, ..., Ssn which are shifted $\pi/n$ ($1/2n$ of the track pitch p) in spatial phase are generated as expressed according to the following equations (17a) through (17n):

$$Ss1 = \sin\frac{2\pi x}{p} \tag{17a}$$

$$Ss2 = \sin\frac{2\pi}{p}\left(x - \frac{p}{2n}\right) \tag{17b}$$

$$Ss3 = \sin\frac{2\pi}{p}\left(x - \frac{2p}{2n}\right) \tag{17c}$$

$$\vdots$$

$$Ssn = \sin\frac{2\pi}{p}\left(x - \frac{(n-1)p}{2n}\right) \tag{17n}$$

These n differential signals Ss1–Ssn are multiplied, thereby producing a tracking control signal STn which is expressed according to the following equation (18):

$$\begin{aligned} STn &= Ss1 \cdot Ss2 \cdot Ss3 \ldots Ssn \\ &= kn \cdot \sin(n \cdot 2\pi x/p). \end{aligned} \tag{18}$$

As is apparent from the equation (18), the tracking control signal STn is represented by a sine wave whose spatial period is $1/n$ of the track pitch p and which crosses the zero value in a positive direction at each of the center of any track Ti and $(n-1)$ intermediate points between two adjacent tracks, e.g., tracks Ti, Ti+1.

According to the embodiment shown in FIG. 13, therefore, tracks spaced at $1/n$ of the conventional track pitch p, i.e., at a density which is n times the density of the conventional tracks, can well be followed while the same light source and lens system as those of the conventional arrangement are employed. Therefore, the tracking control method according to the fourth embodiment is effective for use with optical discs of the continuous groove type whose recording density is n times the conventional recording density.

Figure 14:
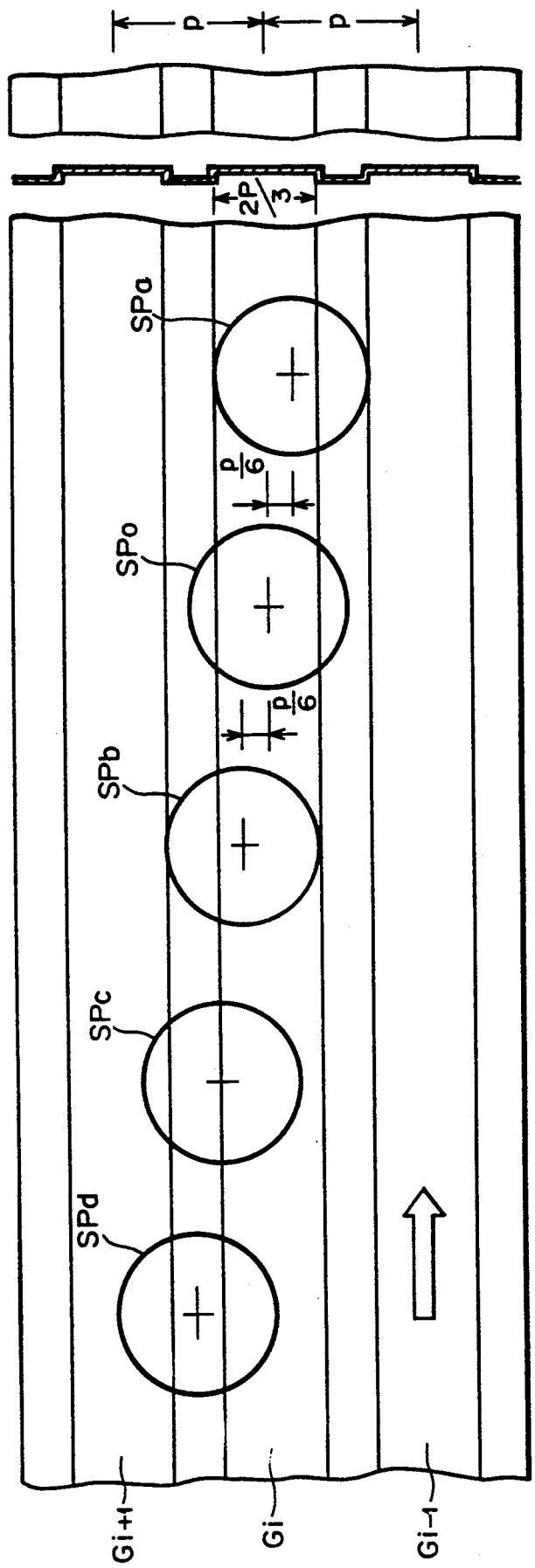
FIG. 14 is a schematic view illustrating a tracking control method for an optical disc system according to a fifth embodiment of the present invention.

According to the three-spot method, as shown in FIG. 14 which illustrates a fifth embodiment of the present invention, a fourth auxiliary beam spot SPd of diffracted light of third order, for example, which may be produced by passing a laser beam from a laser beam source through a diffraction grating, is applied to an optical disc in addition to a main beam spot SPo and auxiliary beam spots SPa, SPb, SPc as shown in FIG. 6.

The beam spots SPo, SPa, SPb, SPc, SPd are spaced or offset by 1/6 of the track pitch p in the radial direction of the optical disc.

In the fifth embodiment, three differential signals Sab, Soc, Sbd corresponding to respective pairs of the beam spots, as with the embodiment shown in FIG. 9. The differential signals Sab, Soc, Sbd are shifted $\pi/3$ (1/6 of the track pitch p) in spatial phase as indicated by the following equations (19a), (19b), and (19c):

$$Sab = k \cdot \sin\frac{2\pi x}{p} \tag{19a}$$

$$Soc = k \cdot \sin\frac{2\pi}{p}\left(x - \frac{p}{6}\right) \tag{19b}$$

$$Sbd = k \cdot \sin\frac{2\pi}{p}\left(x - \frac{2p}{6}\right) \tag{19c}$$

where $k = 2\sin(\pi/3)$.

As with the previous embodiments, the three differential signals Sab, Soc, Sbd are multiplied, thereby producing a tracking control signal ST3 which is expressed according to the following equation (20):

$$\begin{aligned} ST3 &= Sab \cdot Soc \cdot Sbd \\ &= k3 \cdot \sin(3 \cdot 2\pi x/p). \end{aligned} \tag{20}$$

As can be seen from the equation (20), the tracking control signal ST3 is represented by a sine wave whose spatial period is $\frac{1}{3}$ of the track pitch p and which crosses the zero value in a positive direction at each of the center of any track Ti and two intermediate points between two adjacent tracks, e.g., tracks Ti, Ti+1.

According to the embodiment shown in FIG. 14, therefore, tracks spaced at $\frac{1}{3}$ of the conventional track pitch p, i.e., at a density which is three times the density of the conventional tracks, can well be followed while the same light source and lens system as those of the conventional arrangement are employed. Therefore, the tracking control method according to the fifth embodiment is effective for use with optical discs of the continuous groove type whose recording density is three times the conventional recording density.

Generally, in order for a tracking control method to deal with optical discs of the continuous groove type whose recording density is n times the conventional recording density, n differential signals Sd1, Sd2, Sd3, ..., Sdn which are shifted $\pi/n$ ($1/2n$ of the track pitch p) in spatial phase are generated as expressed according to the following equations (21a) through (21n):

$$Sd1 = \sin\frac{2\pi x}{p} \tag{21a}$$

$$Sd2 = \sin\frac{2\pi}{p}\left(x - \frac{p}{2n}\right) \tag{21b}$$

$$Sd3 = \sin\frac{2\pi}{p}\left(x - \frac{2p}{2n}\right) \tag{21c}$$

$$\vdots$$

$$Sdn = \sin\frac{2\pi}{p}\left(x - \frac{(n-1)p}{2n}\right) \tag{21n}$$

These n differential signals Sd1–Sdn are multiplied, thereby producing a tracking control signal STn which is expressed according to the following equation (22):

$$\begin{aligned} STn &= Sd1 \cdot Sd2 \cdot Sd3 \ldots Sdn \\ &= kn \cdot \sin(n \cdot 2\pi x/p). \end{aligned} \tag{22}$$

As is apparent from the equation (22), the tracking control signal STn is represented by a sine wave whose spatial period is 1/n of the track pitch p and which crosses the zero value in a positive direction at each of the center of any track Ti and (n−1) intermediate points between two adjacent tracks, e.g., tracks Ti, Ti+1.

According to the embodiment shown in FIG. 14, therefore, tracks spaced at 1/n of the conventional track pitch p, i.e., at a density which is n times the density of the conventional tracks, can well be followed while the same light source and lens system as those of the conventional arrangement are employed. Therefore, the tracking control method according to the fifth embodiment is effective for use with optical discs of the continuous groove type whose recording density is n times the conventional recording density.

Figure 15:
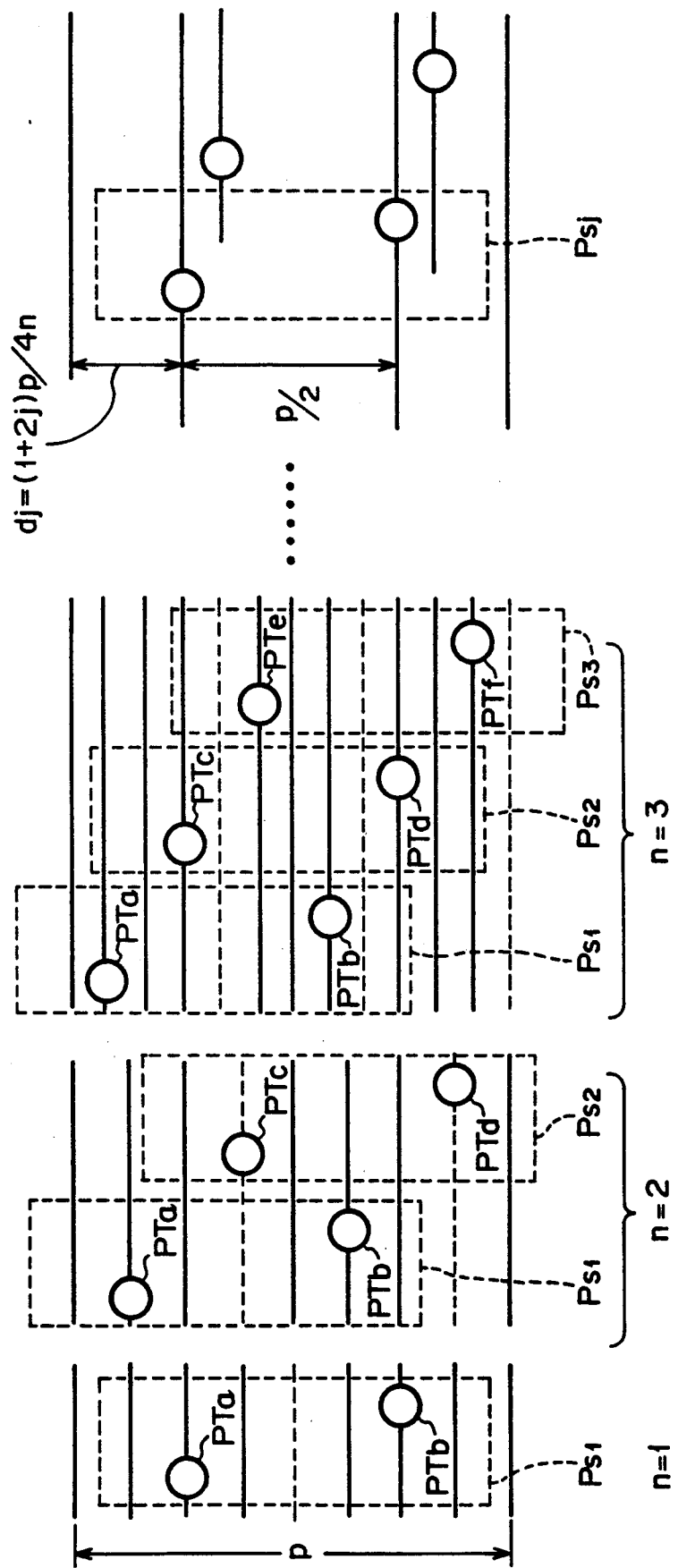
FIG. 15 is a schematic view illustrating a tracking control method for an optical disc system according to a sixth embodiment of the present invention.

The present invention is also capable of dealing with sampled-format optical discs of higher recording density, as follows:

On an optical disc of the sampled-format type whose recording density is three times the conventional recording density, as shown in FIG. 15 which shows a sixth embodiment of the present invention, a third pair Ps3 of servo pits PTe, Ptf is provided in addition to two pairs Ps1, Ps2 of servo pits PTa, PTb and PTc, PTd as shown in FIG. 11.

The servo pit pairs Ps1, Ps2, Ps3 are spaced 1/6 of the track pitch in the radial direction of the optical disc.

Three differential signals Sba, Sdc, Sfe corresponding to the servo pit pairs Ps1, Ps2, Ps3 (PTa~PTf)

The differential signals Sba, Sdc, Sfe are shifted $\pi/3$ (1/6 of the track pitch p) in spatial phase as indicated by the above equations (15a), (15b), (15c), and (19a), (19b), (19c).

As with the previous embodiments, the three differential signals Sba, Sdc, Sfe are multiplied, thereby producing a tracking control signal ST3 that is represented by a sine wave whose spatial period is $\frac{1}{3}$ of the track pitch p and which crosses the zero value in a positive direction at each of the center of any track Ti and two intermediate points between two adjacent tracks, e.g., tracks Ti, Ti+1, as indicated by the above equations (16), (20).

According to the embodiment shown in FIG. 15, therefore, tracks spaced at $\frac{1}{3}$ of the conventional track pitch p, i.e., at a density which is three times the density of the conventional tracks, can well be followed while the same light source and lens system as those of the conventional arrangement are employed. Therefore, the tracking control method according to the sixth embodiment is effective for use with optical discs of the sampled-format type whose recording density is three times the conventional recording density.

Generally, in order for a tracking control method to deal with optical discs of the sampled-format type whose recording density is n times the conventional recording density, n pairs of servo pits Ps1~Psn are provided on the optical disc, the n servo pit pairs being spaced 1/2n of the track pitch p in the radial direction of the optical disc.

The distance dj between any pair Psj of servo pits and a reference line is equal to (1+2j)/4n of the track pitch p as shown in FIG. 15.

To effect tracking control on such an optical disc whose recording density is n times the conventional recording density, there are generated n differential signals Sba, ..., Sji, ..., Snm which are shifted $\pi/n$ (1/2n of the track pitch p) in spatial phase as expressed according to the above equations (17a) through (17n) and (21a) through (21n).

These n differential signals Sba–Snm are multiplied, thereby producing a tracking control signal STn that is represented by a sine wave whose spatial period is 1/n of the track pitch p and which crosses the zero value in a positive direction at each of the center of any track Ti and (n−1) intermediate points between two adjacent tracks, e.g., tracks Ti, Ti+1, as indicated by the above equations (18), (22).

According to the embodiment shown in FIG. 15, therefore, tracks spaced at 1/n of the conventional track pitch p, i.e., at a density which is n times the density of the conventional tracks, can well be followed while the same light source and lens system as those of the conventional arrangement are employed. Therefore, the tracking control method according to the sixth embodiment is effective for use with optical discs of the sampled-format type whose recording density is n times the conventional recording density.

With the present invention, as described above, n pairs of light beams are applied to an optical disc to form a plurality of beam spots thereon which are offset by 1/2n of a track pitch p, and n signals which are shifted p/2n in spatial phase are generated on the basis of the beam spots. These n signals are multiplied to produce a tracking control signal whose spatial period is 1/n of the track pitch p. Such a tracking control method is capable of effecting tracking control on an optical disc whose recording tracks are arranged at a high density that exceeds the spatial cutoff frequency of an optical system of conventional nature used with the tracking control method.

Furthermore, n pairs of servo pits which are offset by 1/2n of a tracking pitch p are disposed on an optical disc, and scanned by a light beam to produce n signals that are shifted p/2n in spatial phase. These n signals are multiplied to produce a tracking control signal whose spatial period is 1/n of the track pitch p. Such a tracking control method is also capable of effecting tracking control on an optical disc whose recording tracks are arranged at a high density that exceeds the spatial cutoff frequency of an optical system of conventional nature used with the tracking control method.

Although certain preferred embodiments have been shown and described, it should be understood that many changes and modifications may be made therein without departing from the scope of the appended claims.

I claim as my invention:

1. A tracking control apparatus for controlling a light beam to follow a track on an optical disc, comprising:
   a laser source for generating a plurality of light beams;
   means for applying the light beams from said laser source to the optical disc as beam spots which are offset on the optical disc by 1/2n (n is a positive integer of 2 or more) of a track pitch on the optical disc;
   photodetector means for detecting light beams reflected by the optical disc from said beam spots;
   tracking control signal generating means for generating n signals which are shifted 1/2n of the track pitch in spatial phase, based on a detected output signal from said photodetector means, and for multiplying said n signals together to produce a tracking control signal whose spatial period is 1/n of the track pitch; and means for controlling the light beam applied from said laser source to the optical disc based on said tracking control signal.

2. A tracking control apparatus according to claim 1, wherein said photodetector means comprises at least two photodetectors each having two light-detecting elements, and wherein said tracking control signal generating means comprises differential signal generating means for generating differential signals representing the differences between detected output signals from said light-detecting elements of the photodetectors, and multiplying means for multiplying said differential signals.

3. A tracking control apparatus according to claim 1, wherein said photodetector means comprises a plurality of light-detecting elements for detecting light beams reflected by the optical disc from the beam spots thereon, and wherein said tracking control signal generating means comprises a plurality of differential signal generating means for generating differential signals representing the differences between detected output signals from those light-detecting elements which detect the light beams from the beam spots that are offset by 1/n of the track pitch, and multiplying means for multiplying said differential signals.

4. A tracking control apparatus for controlling a light beam to follow a track on an optical disc having n pairs of wobbling pits which are offset by 1/2n (n is a positive integer of 2 or more) of a track pitch on the optical disc, said tracking control apparatus comprising:

a laser source for generating a light beam;

photodetector means for detecting a light beam reflected by the optical disc from said wobbling pits;

tracking control signal generating means for generating n signals which are shifted 1/2n of the track pitch in spatial phase, based on a detected output signal from said photodetector means, and for multiplying said n signals together to produce a tracking control signal whose spatial period is 1/n of the track pitch; and means for controlling the light beam applied from said laser source to the optical disc based on said tracking control signal.

5. A tracking control apparatus according to claim 4, wherein said tracking control signal generating means comprises first sample-and-hold means for sampling and holding detected output signals which are produced by said photodetector means by scanning a preceding one of said pairs of wobbling pits with the light beam from said laser source, second sample-and-hold means for sampling and holding detected output signals which are produced by said photodetector means by scanning a succeeding one of said pairs of wobbling pits with the light beam from said laser source, and multiplying means for multiplying output signals from said first and second sample-and-hold means.

6. A method of controlling a light beam to follow a track on an optical disc, comprising the steps of:

applying a plurality of light beams from a laser source to the optical disc as beam spots which are offset on the optical disc by 1/2n (n is a positive integer of 2 or more) of a track pitch on the optical disc;

detecting light beams reflected by the optical disc from said beam spots, with photodetector means;

generating n signals which are shifted 1/2n of the track pitch in spatial phase, based on a detected output signal from said photodetector means;

multiplying said n signals together to produce a tracking control signal whose spatial period is 1/n of the track pitch; and controlling the light beam from said laser source based on said tracking control signal.

7. A method according to claim 6, wherein said photodetector means comprises at least two photodetectors each having two light-detecting elements, further comprising the steps of generating differential signals representing the differences between detected output signals from said light-detecting elements of the photodetectors, and multiplying said differential signals to produce said tracking control signal.

8. A method according to claim 6, wherein said photodetector means comprises a plurality of light-detecting elements for detecting light beams reflected by the optical disc from the beam spots thereon, further comprising the steps of generating differential signals representing the differences between detected output signals from those light-detecting elements which detect the light beams from the beam spots that are offset by 1/n of the track pitch, and multiplying said differential signals to produce said tracking control signal.

9. A method of controlling a light beam to follow a track on an optical disc having n pairs of wobbling pits which are offset by 1/2n (n is a positive integer of 2 or more) of a track pitch on the optical disc, said method comprising the steps of:

applying a light beam from a laser source to the optical disc;

detecting a light beam reflected by the optical disc from said wobbling pits, with photodetector means;

generating n signals which are shifted 1/2n of the track pitch in spatial phase, based on a detected output signal from said photodetector means;

multiplying said n signals together to produce a tracking control signal whose spatial period is 1/n of the track pitch; and controlling the light beam from said laser source based on said tracking control signal.

10. A method according to claim 9, further comprising the steps of generating a first signal by sampling and holding detected output signals which are produced by said photodetector means by scanning a preceding one of said pairs of wobbling pits with the light beam from said laser source, generating a second signal by sampling and holding detected output signals which are produced by said photodetector means by scanning a succeeding one of said pairs of wobbling pits with the light beam from said laser source, and multiplying said first and second signals to produce said tracking control signal.

* * * * *